United States Patent [19]

Simmons

[11] Patent Number: 5,244,472
[45] Date of Patent: Sep. 14, 1993

[54] PREPARATION OF CHEMICALLY DRIED CELLULOSIC FUEL

[76] Inventor: John J. Simmons, 220 Avenue B West, Bismarck, N. Dak. 58501

[21] Appl. No.: 361,816

[22] Filed: Jun. 1, 1989

Related U.S. Application Data

[63] Continuation of Ser. No. 51,533, May 13, 1987, abandoned.

[51] Int. Cl.$^5$ ............................................. C10L 5/00
[52] U.S. Cl. ........................................ 44/505; 44/502; 44/545; 44/606
[58] Field of Search ................... 44/502, 505, 545, 606

[56] References Cited

U.S. PATENT DOCUMENTS

| | | | |
|---|---|---|---|
| 3,988,121 | 10/1976 | Leveskis | 44/41 |
| 4,147,518 | 4/1978 | DeHart et al. | 44/13 |
| 4,243,394 | 1/1981 | Kincaid | 44/14 |
| 4,530,700 | 7/1985 | Sawyer et al. | 44/606 |
| 4,705,533 | 11/1987 | Simmons | 44/6 |

FOREIGN PATENT DOCUMENTS

| | | | |
|---|---|---|---|
| 1154594 | 10/1983 | Canada | 44/606 |
| 0151697 | 9/1982 | Japan | 44/1 E |
| 1064790 | 4/1986 | Japan | 44/1 D |
| 8400490 | 9/1985 | Netherlands | 44/1 E |
| 1439950 | 7/1976 | United Kingdom | 44/1 E |
| 2169311 | 7/1986 | United Kingdom | 44/6 |

*Primary Examiner*—George Fowson
*Attorney, Agent, or Firm*—Vidas, Arrett & Steinkraus

[57] ABSTRACT

Wood chips, bark, sawdust and other cellulosic products containing unacceptably high quantities of water are dried and enriched in BTU content. The green or freshly cut wood product is immersed in hot oil to dry the wood. After water exits the wood pores as steam, some oil enters these interstices, impregnating the dried wood, thereby increasing its BTU content and improves its storing and burning characteristics. Chips and bark dried in and impregnated with used or waste oil, provide an environmentally acceptable means of disposing of and utilizing used or waste oils. Wood chips dried and impregnated with vegetable oil, provide a clean burning, non-toxic fuel for lighting or starting charcoal and wood.

2 Claims, No Drawings

PREPARATION OF CHEMICALLY DRIED CELLULOSIC FUEL

This is a continuation of co-pending application Ser. No. 07/051,533 filed on May 13, 1987, now abandoned.

I. DESCRIPTION

Field of the Invention

This invention relates to a method of drying and preparing wood chips and other wood products with oil and dry compositions produced thereby.

II. BACKGROUND OF THE INVENTION

Various types and combinations of petroleum products are used as starter fuels for charcoal, wood and other fuels. A popular type is Wizard ® brand charcoal lighter from Boyle-Midway, Inc. of New York, N.Y. which burns quite completely, but is highly flammable and can be extremely dangerous. In some cases the petroleum starter fuel may only partly impregnate the edges of charcoal which then burns incompletely, causing a petroleum odor that penetrates the cooked food. Explosive burning can result when these liquid petroleum starters, which have a low flash point, are sprayed on hot coals. Severe burning and in some cases death has resulted from the use of such liquid fire starter products.

Other types of charcoal and wood starters have been developed that are less dangerous, some of which consist of wax impregnated sawdust, wood or fiber particles. These starters are usually more costly to produce and can impart a waxy odor and taste to food if incompletely burned.

The product composition of said invention, on the other hand, ignites easily and burns completely, thereby enabling the charcoal or wood to burn without the necessity of attempting a dangerous "second start". If a "second start" becomes necessary, the oil impregnated dried wood chips can be added with a low risk, since the vegetable oil, resin, wood combination has a high flash point.

Green wood chips and bark are consumed in large quantities by paper mills and other wood processing plants. These wood products have a high moisture content, usually from 45 to 55 percent, and low energy content of about 4,000 BTU/lb. As a result of this high moisture content, an auxiliary fuel such as natural gas, fuel oil or coal is required to obtain the necessary flame temperatures for heating and producing steam. Green wood chips are also increasingly used as a heating fuel for schools, hospitals, manufacturing facilities and public buildings, but the high moisture content of the wood increases freight and operating costs while limiting the efficiency and output of the furnace.

The product composition of said invention, on the other hand, contains a high energy content, varying from 8,500 to 11,500 BTU per pound, and ignites and burns completely, thereby substantially reducing or eliminating the need for auxiliary fuels. The transportation costs, based on delivered BTU's is reduced because water content of the fuel has been substantially reduced, in some cases to the 2-3% level.

The impregnated oil also protects the wood product from reabsorbing moisture. The wood product can, therefore, be stored outside.

Green wood chips typically contain from 45 to 55 percent water. Attempts to dry such wood chips in a kiln or similar device to a low moisture content are inhibited by the tendency of the wood material to char and burn if heated to too high a temperature. Such drying takes an extremely long period of time if the temperature is too low. At low drying temperatures it is also difficult to reach moisture levels of below 10%. Above a moisture level of about 10% the ignition rate of the wood particles is lowered.

The drying required to produce a satisfactory starting material from wood chips requires the removal of both the surface moisture and interstitial water.

Most wood types, including softwood and hardwood or blends of wood types can be satisfactorily dried by the teachings of this invention. However, tests conducted on hot vegetable oil dried wood chips of separate varieties has shown that wood chips of the genus pinus (pine) will ignite faster and burn more readily than wood chips of other varieties, i.e. trembling aspen (poplarus trembli) or birch (genus Betula), oak (genus Quercus), or maple (genus Acer) and are, therefore, more suitable as a starter fuel. This is because pine contains greater quantities of resin and pitch which, when combined with impregnated, entrained vegetable oils starts quicker and burns more readily.

Oils, other than vegetable or palm oil can be used including petroleum oil to obtain the necessary fast starting qualities required, but these oils leave distasteful odors and generate substantially more smoke and soot. Wood chips prepared by drying in hot vegetable and palm oils burn cleanly with little perceptible odor and smoke.

It is highly desirable that charcoal and wood starters be safe while stored in warehouses and on display in retail establishments. High volatile, petroleum based starters are very dangerous and punctured containers caused by errant fork lift handling, droppage or other handling problems, and temperature changes will result in spillage thereby creating dangerous highly flammable situations. This could, in addition to creating a dangerous situation, result in increased insurance rates and/or directives to warehouse and display these materials in specially designated locations.

On the other hand, oil dried wood chips can be safely stored and handled. A broken bag or case may be picked up with a broom and shovel and discarded in standard trash units due to the low volatile nature of the products of the invention.

Petroleum starters are also extremely poisonous and caution must be taken in handling and in placing and keeping the container out of the reach of children. Oil-dried wood chip starters on the other hand contain only wood and vegetable oil, are basically non-toxic and can be handled without the inherent dangers of petroleum starters.

The use of wood starters of the invention instead of petroleum starters could save many lives and prevent thousands of burn injuries.

Others have tried to prepare charcoal and wood starters by first drying wood sawdust and impregnating the sawdust with wax. In Dehart et al U.S. Pat. No. 4,147,518, paraffin waxes are utilized at a ratio of about two parts wax to one part wood.

Wood chips prepared for use as an industrial or home heating fuel can be dried using low cost fuel oil, waste oil or combinations. Wood chips dried in waste oil provide a very high BTU fuel, varying from 10,500 to 11,500 BTU/lb., which ignites and burns readily. Such products are highly usable fuels and also represent an environmentally safe method of utilizing and thereby disposing of waste and used oil since the dried wood contains from about 5 to about 35 percent and more, preferably about 10 to 30 percent impregnated oil, yet is practically "dry" to the touch. The waste oil in effect is converted from a difficult to handle, messy and sometimes nearly toxic fuel to a safe, easily handled, readily burnable fuel.

It was also discovered that when certain wood types, i.e. trembling aspen (poplarus trembli) are dried in No. 5 residual fuel oil, that the combustion air can be controlled to produce a fine, carbon laden soot which can be collected as carbon black. The quality of the carbon black collected is similar to that obtained during the production of carbon black from the incomplete combustion of natural gas which is a major source of carbon black. Carbon black produced by the subject invention would be lower in cost and conserve dwindling quantities of natural gas.

III. BRIEF SUMMARY OF THE INVENTION

Wood chip starter fuels for use as a charcoal starter utilize wood chips and particles of the genus Pinus are dried to decrease the water content, increase the BTU content and ignite more easily. Pine trees are cut and delimbed. The delimbed pine tree is then chipped in a standard wood chipping machine to produce a chip product approximately two inches by one-fourth inch in size. The wood chips are then screened to a product which is preferably one and one-half inches by three-eighths inch in diameter. Of course, if undried wood is available in other shapes such as elongated forms of less than about four inches in thickness and greater than three inches in length, acceptable fire starter products may be made. The greater length is an advantage when the product is used on a fireplace grate.

The prepared, screened wood chips are then immersed in a vegetable oil, preferably sunflower, soy bean, corn or peanut oil that has been heated to a temperature of between 250° to 350° F. (121° to 177° C.) During the heating/drying process, moisture is removed from the wood, exiting as steam and the hot oil penetrates and coats the wood particles, partially replacing some of the expended moisture. The impregnated oil protects the material from absorbing moisture and substantially improves lighting and burning qualities.

After the moisture is removed to below about five percent by weight by drying for approximately twelve (12) minutes, the wood chips are removed from the hot oil, and the excess oil is drained for recycling by screening or static draining.

After screening, the hot material is cooled and placed in storage or packed for shipment. Cooling is very important in batch and continuous processes. Without cooling, the dried wood chips have a tendency to heat spontaneously in the interior of the batch of wood chips. The dried wood material typically has an energy value of between about 9,000 to over 12,000 BTUs per pound, and may be used as a starting fuel or as a cooking or heating fuel. It must be understood that "wood," "wood chip" or "wood material" as used herein may include all species of wood and could include such fiber materials as corn stalks, out hulls, sunflower seed hulls, peanut hulls, walnut shells and similar materials. Generally, any cellulose-containing plant material could be converted to a usable fuel in accordance with the invention. Small particles after drying may be burned as is or may be pelletized into a larger diameter product. The higher cellulose-containing products provide a less expensive finished product. "Green" as used herein, refers to undried wood or other undried cellulosic-containing plant material.

Water vapor and oil vapors exiting the drying unit are preferably passed through a condenser and then through an oil-water separator. The oil can then be recycled to the drying system.

The dried, oil coated wood is protected with a film of oil which thinly covers the surface and also has penetrated the interior of the wood particle to form a protective coating that will re-absorb little water. The thin surface film and impregnated oil also promotes fast ignition when touched with the flame of a match. Once this thin film of oil ignites, the flame heats and volatilizes the internally absorbed oil and natural wood resins. These volatiles then catch fire, further enhancing the burn until sufficient heat is created to burn the wood material itself. This sequence of burning occurs much faster, and provides a more sustained flame when wood of the genus Pinus is used, as compared to when other wood such as aspen, birch, maple or oak is used. The higher resin and pitch contents of pine contribute materially to the ease and speed of ignition and clean burning qualities of the fuel, the discovery of which is an important part of this invention.

IV. DETAILED DESCRIPTION OF THE INVENTION WOOD DRYING AND PREPARATION OF WOOD CHIP STARTER FUEL

Example 1

Raw, green pine logs with the limbs detached are chipped through a standard wood chipper. The wood chips are sized to pass a one and one-half inch screen with the minus one-fourth undersize passing through a one-fourth inch screen and removed. The minus one and one-half inch plus one-fourth inch wood chips containing approximately 50% moisture and approximately 4,100 BTU's per pound were immersed in sunflower oil heated to 325° F. (163° C.) After heating for approximately twelve minutes the wood chips are removed from the hot oil bath, screened to remove the excess oil, and allowed to cool in a separate container.

Surface oil is largely absorbed to the interior of the wood chip, leaving only a thin surface film with the absorbed oil partially replacing the moisture that exited the wood chip as steam. Additional moisture continues to be emitted from the wood chip until it is cooled to about 150° F. (65° C.) The dried wood chip was then analyzed and found to have an energy content of 11,750 BTUs per pound. The wood chips were analyzed and found to contain 3 percent moisture and 26 percent oil. Samples of the dried and cooled wood chips were placed in the flame of a match and found to ignite immediately. The burning chip then began to burn more vigorously as the flame temperature volatilized the absorbed oil and natural wood resins. The burning gas produced from the volatilized oil was readily noted since it causes a flame that burns substantially higher in height and temperature than the flame of the unprocessed wood. The hot flame temperature and high flame height caused by burning of the oil volatiles substantially enhances the burning of the wood chip itself, promoting more complete combustion of the wood with only a small residue of ash remaining at the end of the burn. The wood chips burned cleanly without a noxious odor and can be handled without soiling of hands or fingers with smelly petroleum oil.

One handful of the dried wood chips was placed in the bottom of the charcoal grill. The charcoal was added to the grill above the wood chips, forming a mound with a small portion of the wood chips exposed to facilitate lighting the chips. A second handful of chips was scattered within the mound of charcoal itself. A match was used to ignite the wood chips at the base of the charcoal. The fire of the burning chips spread rapidly creating a hot fire that was sufficient to fully ignite the charcoal. The flaming wood chips burned for approximately twelve minutes during which time sufficient heat was evolved to start the charcoal burning. After about a twenty minute period, the charcoal formed red hot coals with a fine grey ash covering and was ready for cooking.

It has been found that the use of pine wood chips as opposed to aspen, oak, or maple chips, substantially enhances both the initial ignition and subsequent burning of the wood chip starter fuel. The natural resins and pitch content of the pine combines with the absorbed vegetable oil to create a highly volatile and easily burnable material.

Example 2

Pine wood chips prepared according to the teachings described in Example 1 were placed in a wood-burning fireplace. Two handfuls of wood chips were placed in a flat metal container first placed on the grate of the fireplace. Wood logs were placed over the chips and the chips were ignited with a match. The flame quickly spread until substantially all of the chips were burning. This produced a very hot flame which subsequently ignited the wood. It was noted that the chips burned with a flame at least twelve inches in height which enhanced the ignition of the upper portions of the logs. This long flame length was caused by the heating and subsequent burning of the oil volatiles consisting of both entrained vegetable oil and the natural pine resins and pitch. This contributed materially to the speed and the thoroughness in which the logs were started. Aspen wood chips, prepared and utilized in the same manner produced lower initial flame heights and did not ignite the wood logs as quickly.

Example 3

Pine wood chips were dried and processed according to the teachings described in Example 1. The dried chips were placed in a metal container similar to an empty 2-pound coffee tin. Two handfuls of chips were placed in the tin and one of the chips was ignited. The flame of the ignited chip spread quickly to the other chips until a hot fire was burning in the container. The use of vegetable oil dried wood chips in this manner could serve as an emergency heating source during a snow storm or blizzard and it also could be used as a source of cooking fuel for campers. Two handfuls of chips typically burn for twelve to sixteen minutes providing both heat for warmth and cooking.

Example 4

Aspen, oak, maple and birch trees are cut, and chipped, with limbs attached, through a standard wood chipper. The wood chips were immersed in waste oil heated to a temperature of 325° F. (162° C.) After heating for approximately twelve (12) minutes, the wood chips are removed from the hot waste oil bath, screened to remove the excess oil and allowed to cool. Additional moisture continues to be emitted from the wood chip as steam until the chip cools to about 150° F. (65° C.) The dried wood chips were then analyzed and found to contain an energy content of 11,600 BTU, an oil content of 24 percent and moisture content of 3%.

The low moisture content wood chips can be shipped at a lower cost per BTU delivered, and the high BTU wood fuel is burned more efficiently, increasing the capacity of some boilers since a part of the boiler is not required to dry the fuel. Some boiler systems are designed to utilize wood containing a minimum of 10 to 20 percent moisture. For such systems, the moisture content of the oil dried wood chips is controlled in the drying process by early removal of the wood from the hot oil bath.

Example 5

Aspen, oak, maple and birch trees were cut and chipped with limbs attached, through a standard chipper. The wood chips were immersed in waste oil to a temperature of 325° F. (162° C.). After heating for approximately twelve (12) minutes, the wood chips were removed from the hot waste oil bath, screened to remove the excess oil, mixed with green, undried wood chips or bark and placed in an insulated container. The latent heat from the wood chips heats the green wood chips or bark, removing a portion of their moisture. The green wood chips, acting as a heat sink assist in cooling the hot, dried wood chips. This part of the proccess, therefore, serves two purposes, (a) partially drying the added green wood chips, and (b) assisting in the cooling of the hot wood chips. It is important to provide for adequate cooling of the hot wood chips since they tend to heat up further, spontaneously, when hot, and can either begin to char or eventually catch fire.

Two hundred pounds of hot, oil dried wood chips, were placed in a container at 325° F. without adequate cooling. The chips in the center of the container started to heat up to a point where they were charring, causing a large amount of smoke. This event proved the importance of either cooling the wood chips by provinding suffient aeration, i.e. in a cooling drum; or, by adding a cooling medium, i.e. green wood chips which would serve as a cooling medium and becoming partially dry in the process. The amount of green wood chips can be varied from 5 to 50 percent, preferably 15 to 25 percent.

Green wood chips containing 50% moisture were added at the ratio of 80% dried chips at 325° F. (162° C.), 20% green chips at 70° F. (21° C.). After 30 minutes the materials were separated and the green wood chips assayed 42% moisture, a loss of 8% moisture.

Example 6

Green aspen (poplarus trembli) wood chips were immersed in No. 5 residual fuel oil heated to a temperature of 325° F. (163° C.) After heating for approximately twelve (12) minutes, the wood chips are removed from the hot oil bath, screened to remove the excess oil and allowed to cool. Additional moisture continues to emit from the wood chip as steam until it cools to about 150° F. (65° C.) The dried chips were analyzed and found to contain an energy content of 11,850 BTU/.lb.

The dried wood, impregnated with No. 5 residual fuel oil was burned in air. The smoke was black and contained long sooty carbon particles. The carbon was collected as carbon black on a water chilled receptacle and analyzed. The product contained 98.2 percent carbon and was comparable to commercial carbon black materials.

Green aspen chips were immersed in No. 5 fuel oil heated to a temperature of 325° F. (163° C.) After heating the chips for approximately five minutes, the wood chips were removed while steam as still being emitted from approximately 50% of the wood. The wood continued to emit steam until the temperature dropped to below 212° F. and continued to dry until the temperature dropped below 100° F. The chips contained 8,800 BTU, 14% moisture and approximately 12% oil. Steam being emitted by approximately 50% of the wood particles prevented excess oil being absorbed into the interior of the chip, thereby reducing oil content while still providing a substantially dry wood chip product that can be burned in wood chip burning boilers.

In considering this invention, it must be remembered that the disclosure is illustrative only and that the scope of the invention is to be determined by the appended claims.

What is claimed is:

1. A method for drying green wood to produce dried particulate wood fuel having a higher BTU content, said method comprising:
   (a) chipping green wood to an average particle size of between about 2 and about ¼ inches in diameter;
   (b) immersing the green wood chips in an oil bath, said oil selected from the group consisting of petroleum, vegetable and palm oil;
   (c) heating the oil/wood mixture to a temperature of about 325°–375° F. (163°–191° C.);
   (d) removing the wood chips from the oil bath when the oil content of the wood is between about 10 to about 30 percent by weight and the water content is less than about 10 percent; and
   (e) draining the excess resulting oil from the oil impregnated and oil coated wood chip; further including the step of storing the resulting oil coated wood in an insulated container to allow the latent heat of the resulting oil coated wood to drive further moisture from the wood.

2. The method of claim 1 wherein green undried wood is mixed in with the hot resulting oil coated wood to provide cooling to the hot wood and water removal from the undried wood.

* * * * *

UNITED STATES PATENT AND TRADEMARK OFFICE
CERTIFICATE OF CORRECTION

PATENT NO. : 5,244,472
DATED : September 14, 1993
INVENTOR(S) : John J. Simmons

It is certified that error appears in the above-indentified patent and that said Letters Patent is hereby corrected as shown below:

Column 3, line 65 delete "out" insert --oat--.

Signed and Sealed this

Twelfth Day of April, 1994

Attest:

BRUCE LEHMAN

Attesting Officer       Commissioner of Patents and Trademarks